United States Patent [19]

Jamieson

[11] Patent Number: 4,797,028
[45] Date of Patent: Jan. 10, 1989

[54] BEAVER CONTROL SIPHON APPARATUS

[76] Inventor: Robert E. Jamieson, Rte. 4, Box 151, Ripley, Miss. 38663

[21] Appl. No.: 212,904

[22] Filed: Jun. 29, 1988

[51] Int. Cl.$^4$ ............................................. E02B 8/06
[52] U.S. Cl. ...................................... 405/108; 405/80; 405/127; 137/132
[58] Field of Search ...................... 405/39, 40, 41, 42, 405/80, 81, 82, 83, 108, 127; 137/123, 140, 132

[56] References Cited

U.S. PATENT DOCUMENTS

| | | | |
|---|---|---|---|
| 2,059,927 | 11/1936 | Beck | 405/83 |
| 3,086,655 | 8/1960 | Compton | 405/127 X |
| 3,323,536 | 6/1967 | O'Connor et al. | 405/127 X |
| 3,575,004 | 4/1971 | Gachne | 405/80 X |
| 3,951,163 | 4/1976 | Rodieck | 405/40 X |
| 4,480,655 | 11/1984 | Teglund et al. | 137/132 |
| 4,662,782 | 5/1987 | Lambert | 405/80 X |

FOREIGN PATENT DOCUMENTS

| | | | |
|---|---|---|---|
| 0202128 | 6/1956 | Australia | 405/108 |
| 0016717 | 2/1981 | Japan | 405/127 |
| 0175614 | 9/1985 | Japan | 405/87 |
| 0670667 | 6/1979 | U.S.S.R. | 405/80 |
| 0682592 | 8/1979 | U.S.S.R. | 405/80 |

OTHER PUBLICATIONS

Evaluating Beaver Guards on Restricted Flow Risers of Soil Conservation Service Flood Control Impoundments, Masters Thesis, Oklahoma State, R. E. Reynolds, 12–1976.

*Primary Examiner*—Randolph A. Reese
*Assistant Examiner*—Arlen R. Olsen
*Attorney, Agent, or Firm*—Walker & McKenzie

[57] ABSTRACT

A siphon apparatus for hindering beavers from blocking the inlet of a flood control riser in a water reservoir. The siphon apparatus includes a first conduit for being positioned within the riser, the first conduit having a lower end and an upper end; a second conduit for being positioned outside the riser, the second conduit having a lower end and an upper end, the lower end of the second conduit being at a higher vertical plane than the lower end of the first conduit; and a third conduit for joining the upper ends of the first and second conduit and for allowing water to be siphoned from the lower end of the second conduit to the lower end of the first conduit.

8 Claims, 2 Drawing Sheets

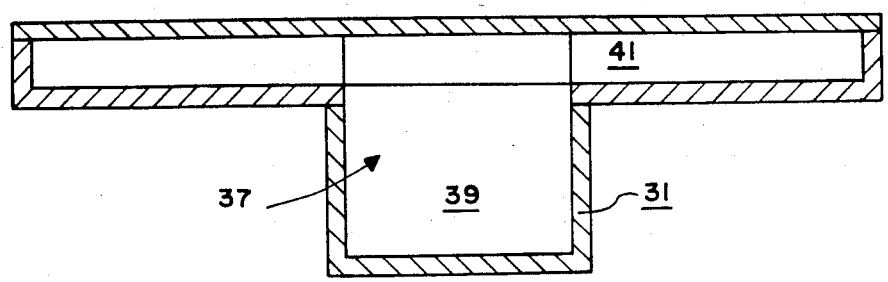
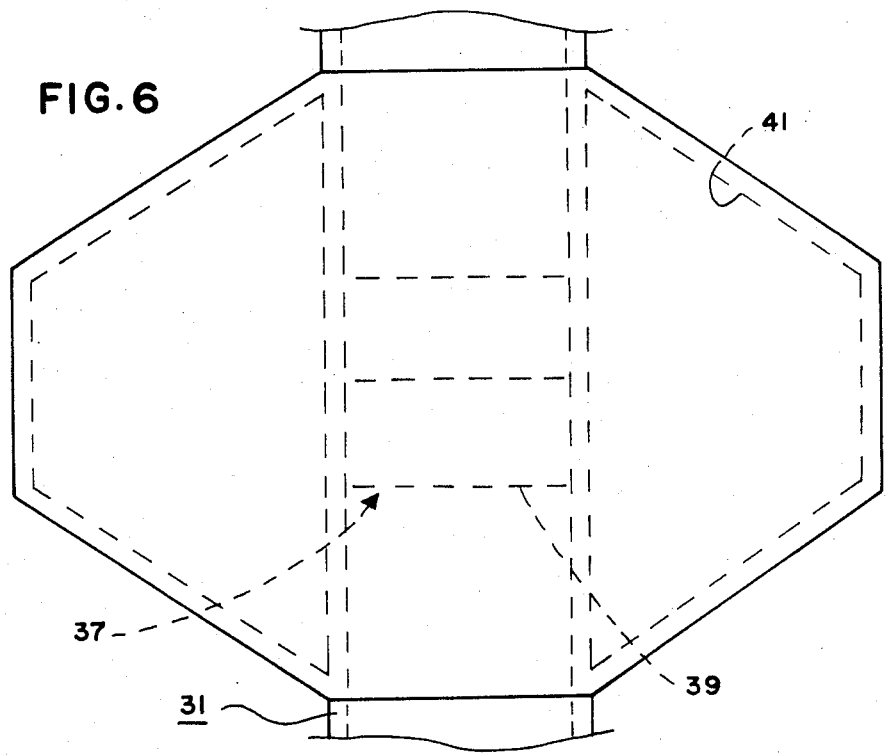
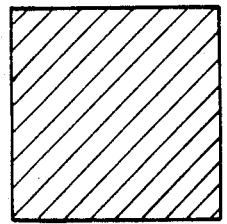
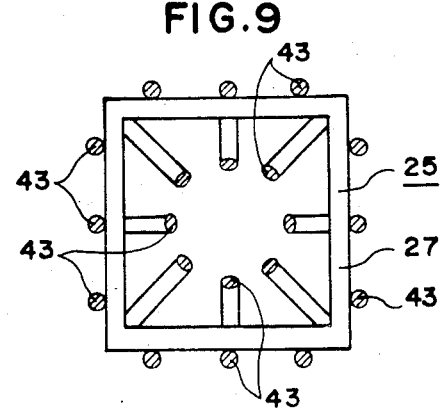

BEAVER CONTROL SIPHON APPARATUS

BACKGROUND OF THE INVENTION

1. Field of the Invention

The present invention relates, in general, to an apparatus for controlling the blockage by beavers of the inlet of a flood control riser in a water reservoir.

2. Description of the Related Art

A preliminary patentability search in class 405, subclasses 40-42, 107 and 108 resulted in the following patents: Buchler, U.S. Pat. No. 929,192; Weinhold, U.S. Pat. No. 1,221,251; Kempf, U.S. Pat. No. 1,123,888; Stickney, U.S. Pat. No. 1,405,071; Soileau, U.S. Pat. No. 3,701,260; Soileau, U.S. Pat. No. 3,803,851; and Lambert, U.S. Pat. No. 4,662,782. None of the above patents disclose or suggest the present invention.

Various methods have been used in an attempt to prevent beavers from blocking the inlet of flood control risers in water reservoirs and the like. The most common method is to merely cover the inlet with a grate or the like which will catch any debris and the like used by beavers to block the inlet; the riser can then be maintained by periodically removing the debris. Another well-known method consists of attaching a downward extending elbow to the inlet. None of the known prior methods have been completely satisfactory.

SUMMARY OF THE INVENTION

The present invention is directed toward providing improved means for hindering beavers from blocking the inlet of a flood control riser in a water reservoir.

The siphon apparatus of the present invention includes a first conduit means for being positioned within the riser, the first conduit means having a lower end and an upper end; a second conduit means for being positioned outside the riser, the second conduit means having a lower end and an upper end, the lower end of the second conduit means being at a higher vertical plane than the lower end of the first conduit means; and a third conduit means for joining the upper ends of the first and second conduit means and for allowing fluid to be siphoned from the lower end of the second conduit means to the lower end of the first conduit means.

The principle objective of the present invention is to prevent beavers from stopping up pipe and concrete risers in flood control structures and lakes. The present invention prevents a continuous low volume flow of water through the riser. Beavers do not bother the riser during periods of full flow or no flow. They are active only when water flows continuously at low flow rates.

The present invention is designed to start siphoning at a desired water level in the lake and lower the water level a specified amount before the siphon is broken. It will start and stop automatically by changes in the water level. This will eliminate the continuous low flow rate that attracts beavers.

The present invention may be constructed from standard pipe and fittings or parts can be custom built to fit specific structures. It is preferably installed four inches or more below the crest of the low stage inlet of the riser to maintain water level below the low stage inlet except after significant rainfall.

The horizontal part of the present invention can be shaped to reduce the amount of time water flows therethrough before it activates the siphoning action. The present invention can be used without this feature but water will flow therethrough longer before activating the siphoning action. The shorter time period of low flow rate decreases the time beavers are attracted to the riser.

The present invention can be mounted and will operate on existing metal or concrete risers. It can also be incorporated in new structures as they are designed and built.

BRIEF DESCRIPTION OF THE DRAWINGS

FIG. 5 is an enlarged sectional view substantially as taken on line V—V of FIG. 1.

FIG. 6 is a top view of a portion of the siphon apparatus of the present invention.

FIG. 7 is a diagrammatic view showing the area of flow through the siphon apparatus of the present invention at a delay means thereof.

FIG. 8 is a diagrammatic view showing the area of flow through the siphon apparatus of the present invention before and after the delay means.

FIG. 9 is an enlarged sectional view substantially as taken on line IX—IX of FIG. 1.

DESCRIPTION OF THE PREFERRED EMBODIMENT

Figure 1:
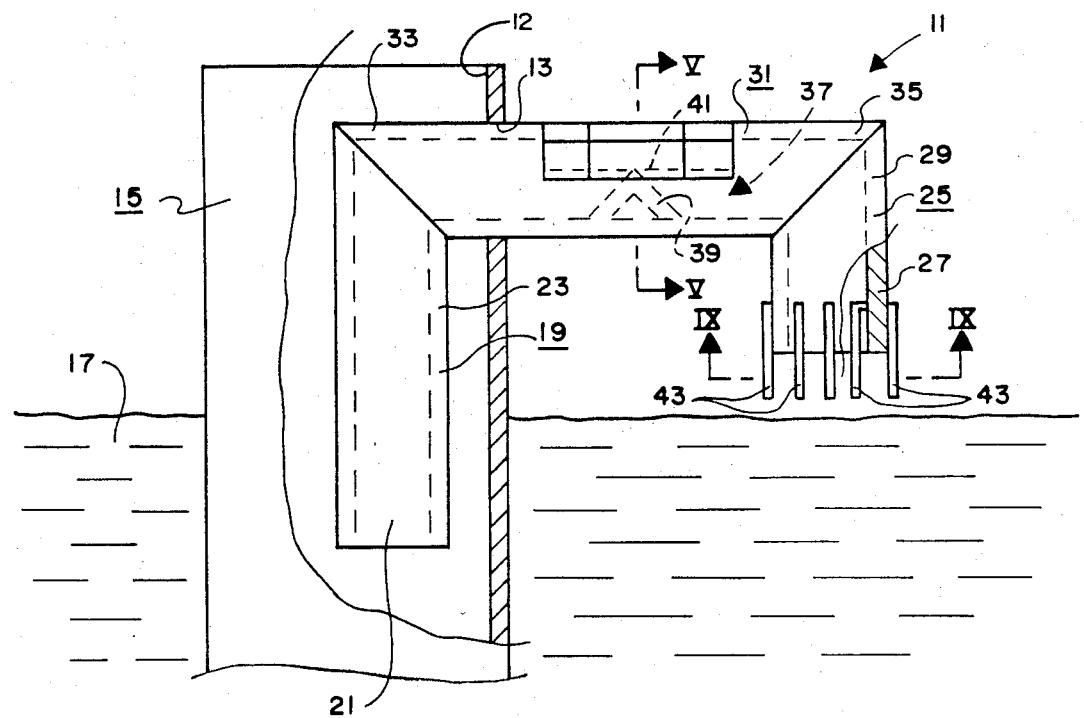
FIG. 1 is a side elevation view of a flood control riser in a reservoir with the siphon apparatus of the present invention combined therewith and with portions thereof broken away and with the reservoir at a low stage.

The siphon apparatus 11 of the present invention is used to hinder beavers from blocking the inlet means of a flood control riser 15 in a water reservoir 17. The flood control riser 15 typically includes a vertical portion (e.g., a vertical pipe) located at the deepest area of the reservoir 17 with the upper end thereof normally extending above the surface of the water in the reservoir and with inlet means located at or substantially at the upper end thereof to allow water from the reservoir 17 to flow thereinto if the level of water in the reservoir 17 rises to or above the inlet means as will now be apparent to those skilled in the art. While the specific construction of the riser 15 and inlet means may vary as will now be apparent to those skilled in the art, the inlet means may include a flood inlet 12 defined or formed by a completely or substantially open upper end of the riser 15, and an inlet port 13 through the side wall of the riser 15 a distance below the flood inlet 12. The inlet port 13 will be used during periods of slow rises to normally maintain the level of water in the reservoir 17 at a desired level while the larger flood inlet 12 will be used during floods and the like when the water in the reservoir 17 rises too fast to timely exit through the inlet port 13. The lower end of the vertical portion of the flood control riser 15 is typically connected to a horizontal portion (e.g., a horizontal pipe), not shown, which extends from the vertical portion through a dam or the like to a drainage point away from the reservoir 17 to allow any drainage from the reservoir 17 to be discharged therethrough as will now be apparent to those skilled in the art.

The siphon apparatus 11 includes a first conduit means 19 for being positioned within the riser 15. The first conduit means 19 has a lower end 21 and an upper end 23. The first conduit means 19 preferably extends substantially vertical within the vertical portion of the riser 15 with the upper end 23 thereof located substantially level with the inlet port 13.

The siphon apparatus 11 includes a second conduit means 25 for being positioned outside the riser 15. The second conduit means 25 has a lower end 27 and an upper end 29. The second conduit means 25 preferably extends substantially vertical outside the vertical portion of the riser 15 with the upper end 29 thereof located substantially level with the inlet port 13. The lower end 27 of the second conduit means 25 is at or on a higher vertical plane than the lower end 21 of the first conduit means 19. In other words, the lower end 21 of the first conduit means 19 is located farther down from the inlet port 13 than the lower end 27 of the second conduit means 25.

Figure 2:
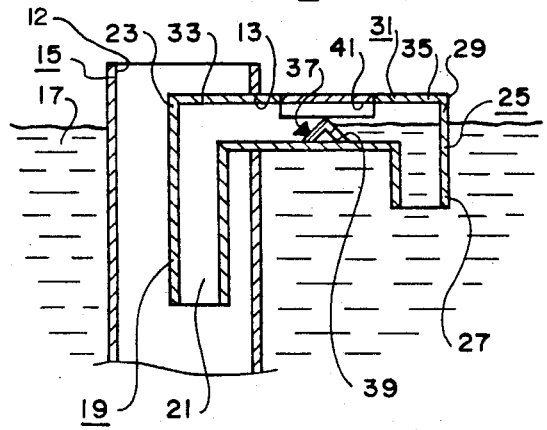
FIG. 2 is a sectional view similar to FIG. 1 but with the water in the reservoir rising to flood stage but still too low to activate the siphon action of the present invention.
Figure 3:
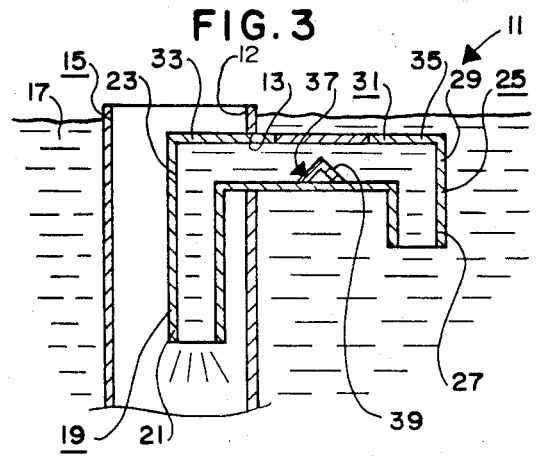
FIG. 3 is a sectional view similar to FIG. 2 but with the water in the reservoir high enough to activate the siphon action of the present invention.
Figure 4:
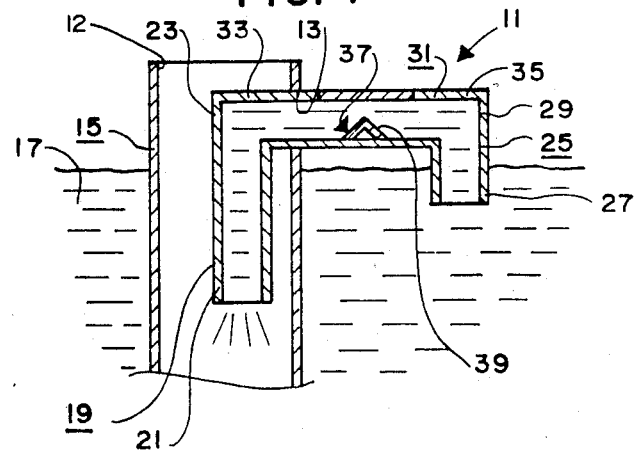
FIG. 4 is a sectional view similar to FIG. 3 but with the water in the reservoir falling below the level needed to activate the siphon action but with the siphon action of the present invention remaining activated.

The siphon apparatus 11 includes a third conduit means 31 for joining the upper ends 23, 29 of the first and second conduit means 19, 25 and for allowing fluid to be siphoned from the lower end 27 of the second conduit means 25 to the lower end 21 of the first conduit means 19. The third conduit means 31 has a first end 33 attached to the upper end 23 of the first conduit means 19 and a second end 35 attached to the upper end 29 of the second conduit means 25. The third conduit means 31 preferably extends through and completely blocks the inlet port 13 as clearly shown in FIGS. 1-4.

The siphon apparatus 11 preferably includes delay means 37 for preventing the flow of water through the third conduit means 31 until the level of water in the reservoir 17 has risen to a level which allows substantially maximum flow through the siphon apparatus 11. The delay means 37 preferably includes blockage means 39 located within the third conduit means 31 for blocking the flow of water through the third conduit means 31 until the level of water in the reservoir 17 has substantially risen to a level which allows maximum flow through the siphon apparatus 11. The cross-sectional area of the third conduit means 31 above the blockage means 39 is preferably enlarged. The interior of the third conduit means 31 preferably has an enlarged area 41 above the blockage means 39 to provide substantially the same flow capabilities through the third conduit means 31 at the blockage means 39 as before and after the blockage means 39. The cross-sectional area of the enlarged area 41 is shown diagrammatically in FIG. 7 and the cross-sectional area of the third conduit means 31 before and after the blockage means 39 is shown diagrammatically in FIG. 8. As is clearly shown, the cross-sectional areas of both FIGS. 7 and 8 are the same even though the cross-sectional shapes thereof are different. The enlarged area 41 of the third conduit means 31 is preferably substantially the same height as the remainder of the third conduit means 31. More specifically, the enlarged area 41 is preferably formed by enlarging the width of the interior of the third conduit means 31 above the blockage means 39 rather than enlarging the height thereof. Thus, when the level of the reservoir 17 is at the top of the third conduit means 31 before and after the blockage means 29, it is also at the top of the enlarged area 41.

The first, second and third conduit means 19, 25, 31 may be constructed of metal pipes or the like having a square, rectangular or round cross-section area, etc., and welded or otherwise fixedly attached to one another. The blockage means 39 may be constructed of metal plates welded or otherwise fixedly positioned within the third conduit means 31.

A plurality of downward extended fingers 43 are preferably attached to the lower end 27 of the second conduit means 25 to hinder the blockage thereof by beavers and the like. A plurality of the fingers 43 may be positioned on the exterior of the lower end 27 of the second conduit means 25 and a plurality of the fingers 43 may be positioned within the lower end 27 of the second conduit means 25 as clearly shown in FIG. 9. The fingers 43 may be constructed out of metal rods and welded or otherwise fixedly attached to the second conduit means 25.

The siphon apparatus 11 may be constructed as an integral part with the riser 15, may be merely attached to the riser 15 before or after the riser 15 has been installed in the reservoir 17 by placing or inserting the first conduit means 19 on or through the inlet port 13 with the lower end 27 of the second conduit means 25 preferably positioned four inches or so below the desired crest of the reservoir 17 and with the lower end 21 of the first conduit means 19 positioned below the lower end 27 of the second conduit means 25 as clearly shown in FIGS. 1-4, etc. A flange, collar or the like (not shown) may be used to secure the apparatus 11 to the riser 15 and a sealer (not shown) may be used to prevent leakage through the inlet port 13 about the third conduit means 31 as will now be apparent to those skilled in the art.

The operation of the siphon apparatus 11 is as follows: The conduit means 19, 25, 31 is preferably associated with or attached to the riser 15 with the lower point of the interior of the third conduit means 31 positioned even with the lower point of the inlet port 13. If the water in the reservoir 17 thereafter rises, it will enter the lower end 27 of the second conduit means 25, rise within the second conduit means 25 until it reaches the second end 35 of the third conduit means 31, and then rise on the blockage means 39 until it finally passes over the top of the blockage means 39. There will be no flow of water through the apparatus 11 (and therefore no attraction of beavers) until the level of the reservoir rises above the top of the blockage means 39. As the water passes over the top of the blockage means 39, it will flow through the third conduit means 31 to the upper end 23 of the first conduit means 19 and then out the lower end 21 of the first conduit means 19 out the flood control riser 15. If the water in the reservoir 17 rises to or above the upper point of the interior of the third conduit means 31 and thus forces all air from the third conduit means 31, a siphon will be created to forcefully draw water from the lower end 27 of the second conduit means 25, through the siphon apparatus 11 and into the flood control riser 15 as will now be apparent to those skilled in the art. Since the cross-section area of the interior of the third conduit means 31 is the same above the blockage means 39 as it is on either side of the blockage means 39, the blockage means 39 will not reduce the flow capabilities of the siphon apparatus 11 as will now be apparent to those skilled in the art. The full flow of water through the apparatus 11 when the siphoning action is started will discourage beavers from attempting to block the apparatus 11. Thus, the only time beavers will be attracted to the apparatus 11 is the relatively short time during which the level of the reservoir 17 rises between the top of the blockage means 39 and the top of the interior of the third conduit means 31 as will now be apparent to those skilled in the art. Once the siphoning action has started, it will continue until the level of the reservoir 17 drops below the lower end 27 of the second conduit 25 as will now be apparent to those skilled in the art.

Although the present invention has been described and illustrated with respect to a preferred embodiment and a preferred use therefor, it is not to be so limited since modifications and changes can be made therein which are within the full intended scope of the invention.

I claim:

1. A siphon apparatus for hindering beavers from blocking the inlet means of a flood control riser in a water reservoir, said siphon apparatus comprising:
   (a) first conduit means for being positioned within said riser, said first conduit means having a lower end and an upper end;
   (b) second conduit means for being positioned outside said riser, said second conduit means having a lower end and an upper end, said lower end of said second conduit means being at a higher horizontal plane than said lower end of said first conduit means;
   (c) horizontal third conduit means for joining said upper ends of said first and second conduit means and for allowing water to be siphoned from said lower end of said second conduit means to said lower end of said first conduit means;
   (d) delay means for preventing the flow of water through said third conduit means until the level of water in said reservoir has risen to a level which allows substantially maximum flow through said siphon apparatus.

2. The siphon apparatus of claim 1 in which said delay means includes blockage means located within said third conduit means for blocking the flow of water through said third conduit means until the level of water in said reservoir has substantially risen to a level which allows maximum flow through said siphon apparatus.

3. The siphon apparatus of claim 2 in which the cross-sectional area of said third conduit means above said blockage means is enlarged.

4. The siphon apparatus of claim 2 in which the interior of said third conduit means has an enlarged area above said blockage means to provide substantially the same flow capabilities through said third conduit means at said blockage means as before and after said blockage means.

5. The siphon apparatus of claim 4 in which said enlarged area of said third conduit means is substantially the same height as the remainder of said third conduit means.

6. A siphon apparatus for a flood control riser in a water reservoir, said siphon apparatus comprising:
   (a) first conduit means for being positioned within said riser, said first conduit means having a lower end and an upper end;
   (b) second conduit means for being positioned outside said riser, said second conduit means having a lower end and an upper end, said lower end of said second conduit means being at a higher horizontal plane than said lower end of said first conduit means;
   (c) horizontal third conduit means for joining said upper ends of said first and second conduit means and for allowing water to be siphoned from said lower end of said second conduit means to said lower end of said first conduit means; and
   (d) delay means for preventing the flow of water through said third conduit means until the level of water in said reservoir has risen to a level which allows substantially maximum flow through said siphon apparatus; said delay means including blockage means located within said third conduit means for blocking the flow of water through said third conduit means until the level of water in said reservoir has substantially risen to a level which allows maximum flow through said siphon apparatus.

7. The siphon apparatus of claim 6 in which the interior of said third conduit means has an enlarged area above said blockage means to provide substantially the same flow capabilities through said third conduit means at said blockage means as before and after said blockage means.

8. The siphon apparatus of claim 7 in which said enlarged area of said third conduit means is substantially the same height as the remainder of said third conduit means.

* * * * *